(12) United States Patent
Nitta et al.

(10) Patent No.: US 8,068,512 B2
(45) Date of Patent: Nov. 29, 2011

(54) EFFICIENT UTILIZATION OF CACHE SERVERS IN MOBILE COMMUNICATION SYSTEM

(75) Inventors: Daisuke Nitta, Kawasaki (JP); Tomonori Kumagai, Kawasaki (JP); Kazunari Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 804 days.

(21) Appl. No.: 11/842,324

(22) Filed: Aug. 21, 2007

(65) Prior Publication Data

US 2008/0133830 A1 Jun. 5, 2008

(30) Foreign Application Priority Data

Dec. 1, 2006 (JP) ................... 2006-326175

(51) Int. Cl.
*H04J 3/16* (2006.01)
(52) U.S. Cl. ........................................ 370/465
(58) Field of Classification Search .................. None
See application file for complete search history.

(56) References Cited

U.S. PATENT DOCUMENTS

| | | | |
|---|---|---|---|
| 6,647,415 B1 * | 11/2003 | Olarig et al. | 709/224 |
| 7,197,608 B2 | 3/2007 | Mikuma et al. | |
| 7,222,169 B2 | 5/2007 | Koshimizu et al. | |
| 2002/0094813 A1 | 7/2002 | Koshimizu et al. | |
| 2003/0004952 A1 * | 1/2003 | Nixon et al. | 707/10 |
| 2003/0154390 A1 | 8/2003 | Yamauchi et al. | |
| 2004/0243839 A1 | 12/2004 | Bhatia et al. | |
| 2005/0228948 A1 | 10/2005 | Mikuma et al. | |
| 2006/0129766 A1 * | 6/2006 | Cassia et al. | 711/137 |

FOREIGN PATENT DOCUMENTS

| | | |
|---|---|---|
| CN | 1774901 | 5/2006 |
| EP | 1 223 724 | 7/2002 |
| JP | 1-245352 | 9/1989 |
| JP | 2000-250803 | 9/2000 |
| JP | 2002-099465 | 4/2002 |
| JP | 2003-030087 | 1/2003 |
| JP | 2003-308268 | 10/2003 |

OTHER PUBLICATIONS

European Search Report dated Dec. 21, 2007 for the corresponding European Application No. EP-07-114784.
"Chinese Office Action", mailed by CN Patent Office and corresponding to Chinese application No. 200710154070.2 on Mar. 30, 2011, with English translation.
Japanese Office Action, mailed Jun. 14, 2011 for corresponding Japanese Application No. 2006-326175, partial English translation.

* cited by examiner

*Primary Examiner* — Raj Jain
(74) *Attorney, Agent, or Firm* — Fujitsu Patent Center

(57) ABSTRACT

A data center includes an individual storage unit having storage areas for respective user apparatuses, a shared storage unit having a storage area for sharing by the user apparatuses, a unit configured to store data received from an external node in one of the individual storage unit and the shared storage unit that is selected according to predetermined criteria, a unit configured to generate a data arrangement list according to statistics of the received data and predetermined cache data arrangement conditions, and a unit configured to transmit an instruction signal to at least one of the shared storage unit and the individual storage unit according to the data arrangement list to cause data stored in the at least one of the shared storage unit and the individual storage unit to be transferred to a cache server provided on a core network or on a radio access network.

15 Claims, 21 Drawing Sheets

FIG.6

| DATA NAME | PATH | NUMBER OF DELIVERED LINKS | SIZE OF ORIGINAL FILE (MB) | DATA TYPE |
|---|---|---|---|---|
| FILE A | /DATA/FILE A | 100 | 100 | #1 |
| FILE B | /DATA/FILE B | 50 | 10 | #3 |
| FILE C | /DATA/FILE C | 100 | 500 | #4 |
| . . . | . . . | . . . | . . . | . . . |

FIG.7

| NODE | CACHE SERVER NAME | CAPACITY OF PRIMARY CACHE SERVER | CAPACITY OF SECONDARY CACHE SERVER | LIMITATION TO DATA SIZE | DATA-TYPE-SPECIFIC PRIORITY | | | | | |
|---|---|---|---|---|---|---|---|---|---|---|
| | | | | | #1 | #2 | #3 | #4 | #5 | #6 |
| CN | CN i | 10 TB | — | 10 GB OR LESS | M | M | H | H | L | L |
| | CN ii | 15 TB | — | 15 GB OR LESS | M | M | H | H | L | L |
| | . . . | . . . | . . . | . . . | . . . | . . . | . . . | . . . | . . . | . . . |
| RAN | AP i | 100 GB | 10 GB | 1 GB OR LESS | H | H | M | M | L | L |
| | AP ii | 200 GB | 10 GB | 1 GB OR LESS | H | H | M | M | L | L |
| | AP iii | 150 GB | 30 GB | 2 GB OR LESS | H | H | M | M | L | L |
| | . . . | . . . | . . . | . . . | . . . | . . . | . . . | . . . | . . . | . . . |

FIG.9

| DATA NAME | PATH | NODE:CN | | | | ... | NODE:RAN | | | | ... |
|---|---|---|---|---|---|---|---|---|---|---|---|
| | | CN i | | CN ii | | | AP i | | AP ii | | |
| | | PRESENT /ABSENT | PATH TO CACHE LOCATION | PRESENT /ABSENT | PATH TO CACHE LOCATION | ... | PRESENT /ABSENT | PATH TO CACHE LOCATION | PRESENT /ABSENT | PATH TO CACHE LOCATION | ... |
| FILE A | DATA /FILE A | | | | | | | | | | |
| FILE B | DATA /FILE B | | | | | | | | | | |
| FILE C | DATA /FILE C | | | | | | | | | | |
| ... | ... | ... | | ... | | ... | ... | | ... | | ... |

FIG.10

| DATA NAME | FILE SIZE (MB) | DATA TYPE | SCORE Xi |
|---|---|---|---|
| FILE A | 100 | #1 | 100 |
| FILE B | 10 | #3 | 50 |
| FILE C | 500 | #4 | 100 |
| . . . | . . . | . . . | . . . |

FIG.11

| DATA NAME | PATH | NODE: CN | | | | ... | NODE: RAN | | | | ... |
|---|---|---|---|---|---|---|---|---|---|---|---|
| | | CN i | | CN ii | | | AP i | | AP ii | | |
| | | PRESENT /ABSENT | PATH TO CACHE LOCATION | PRESENT /ABSENT | PATH TO CACHE LOCATION | | PRESENT /ABSENT | PATH TO CACHE LOCATION | PRESENT /ABSENT | PATH TO CACHE LOCATION | |
| FILE A | /DATA /FILE A | PRESENT | /DATA/CNi /FILE A | PRESENT | /DATA/CNii /FILE A | ... | ABSENT | — | ABSENT | — | ... |
| FILE B | /DATA /FILE B | ABSENT | — | ABSENT | — | ... | PRESENT | /DATA/APi /FILE B | PRESENT | /DATA/APii /FILE B | ... |
| FILE C | /DATA /FILE C | ABSENT | — | ABSENT | — | ... | PRESENT | /DATA/APi /FILE C | ABSENT | — | ... |
| ... | | ... | | ... | | | ... | | ... | | |

FIG.12

| DATA NAME | FILE SIZE (MB) | SCORE Yi |
|---|---|---|
| FILE A | 100 | 150 |
| FILE B | 10 | 100 |
| FILE C | 500 | 200 |
| . . . | . . . | . . . |

FIG.13

| DATA NAME | FILE SIZE (MB) | SCORE Yi |
|---|---|---|
| FILE C | 500 | 200 |
| FILE A | 100 | 150 |
| FILE B | 10 | 100 |
| . . . | . . . | . . . |

FIG.14

| DATA NAME | FILE SIZE (MB) | SCORE Yi |
|---|---|---|
| FILE C | 500 | 200 |
| FILE A | 100 | 150 |
| FILE B | 10 | 100 |
| . . . . . . | . . . . . . | . . . . . . |
| . . . . | . . . . | . . . . |

← DATA TO BE STORED → ← DATA NOT TO BE STORED →

FIG.16

| PATTERN | DATA LOCATION | DESCRIPTION |
|---|---|---|
| 1 | PRIMARY CACHE AREA OF APi | WHEN DATA STORED IN AP CACHE IS TO BE DOWNLOADED |
| 2 | CACHE AREA OF CNi | WHEN DATA NOT STORED IN AP CACHE BUT STORED IN CN CACHE IS TO BE DOWNLOADED |
| 3 | SECONDARY CACHE AREA OF APi | WHEN DATA STORED IN SECONDARY CACHE AREA OF AP IS TO BE DOWNLOADED |
| 4 | SHARED DISK AREA | WHEN SHARED DATA NOT STORED IN ANY PRIMARY CACHE AREA IS TO BE DOWNLOADED |
| 5 | INDIVIDUAL DISK AREA OF TERMINAL i | WHEN INDIVIDUAL DATA THAT IS NOT SHARED IS TO BE DOWNLOADED |

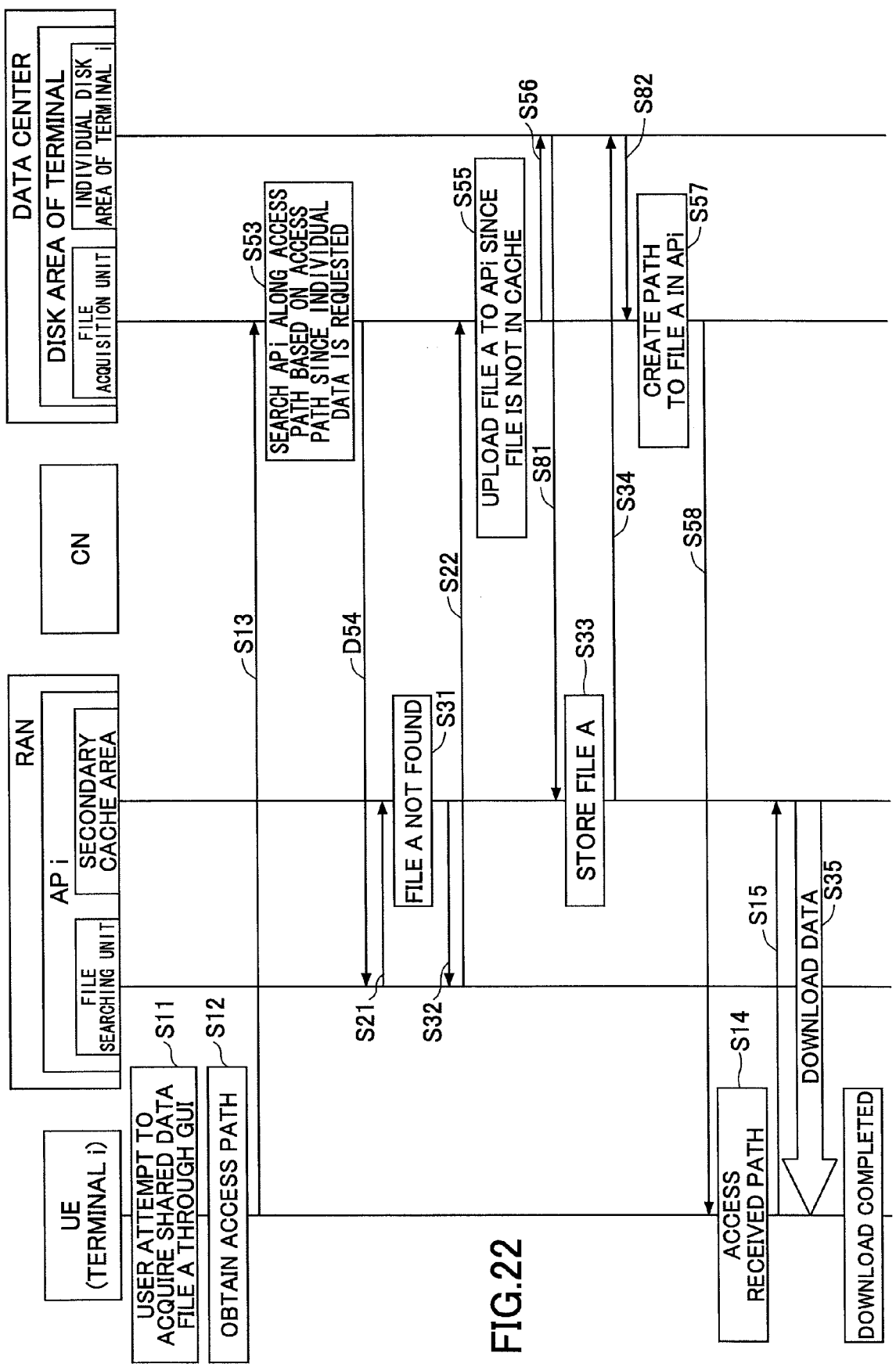

EFFICIENT UTILIZATION OF CACHE SERVERS IN MOBILE COMMUNICATION SYSTEM

CROSS-REFERENCE TO RELATED APPLICATIONS

The present application is based upon and claims the benefit of priority from the prior Japanese Patent Application No. 2006-326175 filed on Dec. 1, 2006, with the Japanese Patent Office, the entire contents of which are incorporated herein by reference.

BACKGROUND OF THE INVENTION

1. Field of the Invention

The present invention generally relates to the technical field of mobile communications, and particularly relates to a data center, cache server, and method for use in a mobile communication system.

2. Description of the Related Art

In the technical field of mobile communications, various services are put into practice as a result of improvements in the performance of mobile terminals such as portable phones. Especially, development in the data delivery service such as music delivery, video delivery, and the like is remarkable. The data delivery service includes a mobile data center type and a data download type, by which users use data downloaded to their user terminals.

In the case of the data download type, delivered data is stored in the terminal device (or in an external memory card or the like attached to the terminal device), so that there is a limit to the size of the data. Further, a problem may arise in that the data may be lost or become in the possession of others due to the loss or failure of the terminal device.

In the case of the mobile-data-center-type service, data delivered to a terminal device is not stored in the terminal device, but is stored in a storage space on the network. In this method, various data including music, video, and private information may be stored on the network. The use of the mobile-data-center-type service offers an advantage in that the data storage size can be significantly increased. Further, the problem of data being lost or becoming in the possession of others due to the loss or failure of the terminal device can be prevented effectively.

The communication speed of portable phones is significantly increasing, and there is also a tendency that the data size of each file will increase. It will become increasingly easier to play data via a network without storing data in the terminal device. It is thus expected that the demand for the mobile-data-center-type service will increase.

When carriers provide mobile-data-center-type services, each carrier needs to store user data. The size of data that needs to be stored will increase as a result of diversification in service type and an increase in the speed and size of communication, which leads to a concern about an increase in the data storage space.

FIG. 1 is a drawing showing a configuration in which a shared storage space (shared disk area) is provided at a data center for a plurality of user apparatuses for the purpose of avoiding such an increase in the data storage space. Data stored in the shared disk area is shared by the plurality of user apparatuses. In the illustrated example, the data contents of "file A" and "file B" are stored in the shared area for terminal apparatus i, ii, and iii, and each terminal has a link file A pointing to the "file A" contents and a link file B pointing to the "file B" contents. With this arrangement, a relatively small storage space is sufficient for the purpose of storing files A, B, and C for the terminal apparatus i, storing files A, B, and E for the terminal apparatus ii, and storing files A, B, and F for the terminal apparatus iii.

Since the data center is situated at a higher level in hierarchy than the radio access network (RAN), there is a risk that the data center may not be able to quickly respond to access from the terminal apparatuses.

Although not specific to mobile communications systems, Patent Document 1 discloses a computer system using a cache hierarchy method in which a reference rate is compared with a threshold to determine whether data should be or should not be stored in cache while ensuring that the same data be not stored in multiple caches. It may be possible to utilize such cache hierarchy in a mobile communication system.

[Patent Document 1] Japanese Patent Application Publication No. 2002-99465

FIG. 2 is a drawing showing a configuration in which a core network CN and a radio access network RAN are each provided with a cache server. In this communication system, storage units are arranged in a descending order of storage capacity as follows: the storage unit of the data center, the cache server of the core network CN, and the cache servers of the radio access network RAN. Further, communication paths are arranged in a descending order of data transfer speed as follows: a communication path A, a communication path B, and a communication path C. In terms of transmission delay with respect to the mobile terminals i and ii, however, RAN, CN, and the data center are arranged in an ascending order. In such system in which a related-art cache system is incorporated, as a general principle, each of the cache memories in hierarchy stores data in the order in which the data is received. Cache efficiency is improved merely by the fact that the duplicate storing of data is avoided to some extent. Depending on the communication state, there may be a situation in which data corresponding to a weak demand for real-time response is stored at a lower level node while data corresponding to a strong demand for real-time response is stored at a higher level node. In this case, the user apparatus needs to go to the length of accessing the higher level node in order to acquire the data corresponding to a strong demand for real-time response. This may undermine the intention to improve data throughput by providing cache memories.

Further, the storage capacity of each cache server provided in the radio access network and the core network is not the same across the board. It is thus difficult to store data in each cache server according to the same decision criteria as was used in the related art.

Accordingly, there is a need to improve data throughput by efficiently utilizing a RAN cache server provided in RAN and a CN cache server provided in CN with respect to a mobile communication system that includes user apparatuses, a radio access network RAN, a core network CN, and a data center connected to the core network.

SUMMARY OF THE INVENTION

It is a general object of the present invention to provide a scheme for improving data throughput in a mobile communication system that substantially obviates one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description.

Objects as well as other features and advantages of the present invention will be realized and attained by a scheme for improving data throughput in a mobile communication system particularly pointed out in the specification in such full, clear, concise, and exact terms as to enable a person having ordinary skill in the art to practice the invention.

To achieve these and other advantages in accordance with the purpose of the invention, the invention provides a data center for use in a mobile communication system that includes a user apparatus, a radio access network, and a core network. The data center includes an individual storage unit having storage areas for respective user apparatuses, a shared storage unit having a storage area for sharing by the user apparatuses, a shared/individual determining unit configured to store data received from an external node in one of the individual storage unit and the shared storage unit that is selected according to predetermined criteria, a data arrangement information generating unit configured to generate a data arrangement list according to statistics of the received data and predetermined cache data arrangement conditions, and a unit configured to transmit an instruction signal to at least one of the shared storage unit and the individual storage unit according to the data arrangement list to cause data stored in the at least one of the shared storage unit and the individual storage unit to be transferred to a cache server provided on the core network or a cache server provided on the radio access network.

According to another aspect of the present invention, a cache server for use on a radio access network or a core network in a mobile communication system that includes a user apparatus, the radio access network, the core network, and a data center which includes an individual storage unit having storage areas for respective user apparatuses, a shared storage unit having a storage area for sharing by the user apparatuses, a shared/individual determining unit configured to store data received from an external node in one of the individual storage unit and the shared storage unit that is selected according to predetermined criteria, and a data arrangement information generating unit configured to generate a data arrangement list according to statistics of the received data and predetermined cache data arrangement conditions. The cache server includes a cache storage unit configured to receive data stored in at least one of the shared storage unit and the individual storage unit from the data center according to the data arrangement list, and a unit configured to transmit data stored in the cache storage unit to the user apparatus in response to a request from the user apparatus.

According to another aspect of the present invention, a cache management method for use in a data center of a mobile communication system that includes a user apparatus, a radio access network, and a core network includes storing data received from an external node in one of an individual storage unit and a shared storage unit that is selected according to predetermined criteria, the individual storage unit having storage areas for respective user apparatuses, and the shared storage unit having a storage area for sharing by the user apparatuses, generating a data arrangement list according to statistics of the received data and predetermined cache data arrangement conditions, and transmitting an instruction signal to at least one of the shared storage unit and the individual storage unit according to the data arrangement list to cause data stored in the at least one of the shared storage unit and the individual storage unit to be transferred to a cache server provided on the core network or a cache server provided on the radio access network.

According to at least one embodiment of the present invention, the cache server provided on the core network and the cache server provided on the radio access network are efficiently utilized, thereby improving throughput in the mobile communication system.

BRIEF DESCRIPTION OF THE DRAWINGS

Other objects and further features of the present invention will be apparent from the following detailed description when read in conjunction with the accompanying drawings, in which:

FIG. 6 is a drawing showing a specific example of link information about each file;

FIG. 7 is a drawing showing a specific example of cache data arrangement conditions regarding each cache server;

FIG. 9 is a drawing showing the data arrangement list halfway through its creation;

FIG. 10 is a drawing showing a list in which scores are assigned to data according to the number of delivered link files;

FIG. 11 is a drawing showing a specific example of a data arrangement list;

FIG. 12 is a drawing showing a list in which scores are assigned to data according to the number of delivered link files and data-type-specific priority;

FIG. 13 is a drawing showing a list in which contents are rearranged according to scores;

FIG. 14 is a drawing showing the removal of part of a list;

FIG. 16 is a table listing possible data acquisition patterns for users;

FIG. 22 is a flowchart showing the procedure performed when a user acquires data according to pattern 5.

DESCRIPTION OF THE PREFERRED EMBODIMENTS

Figure 1:
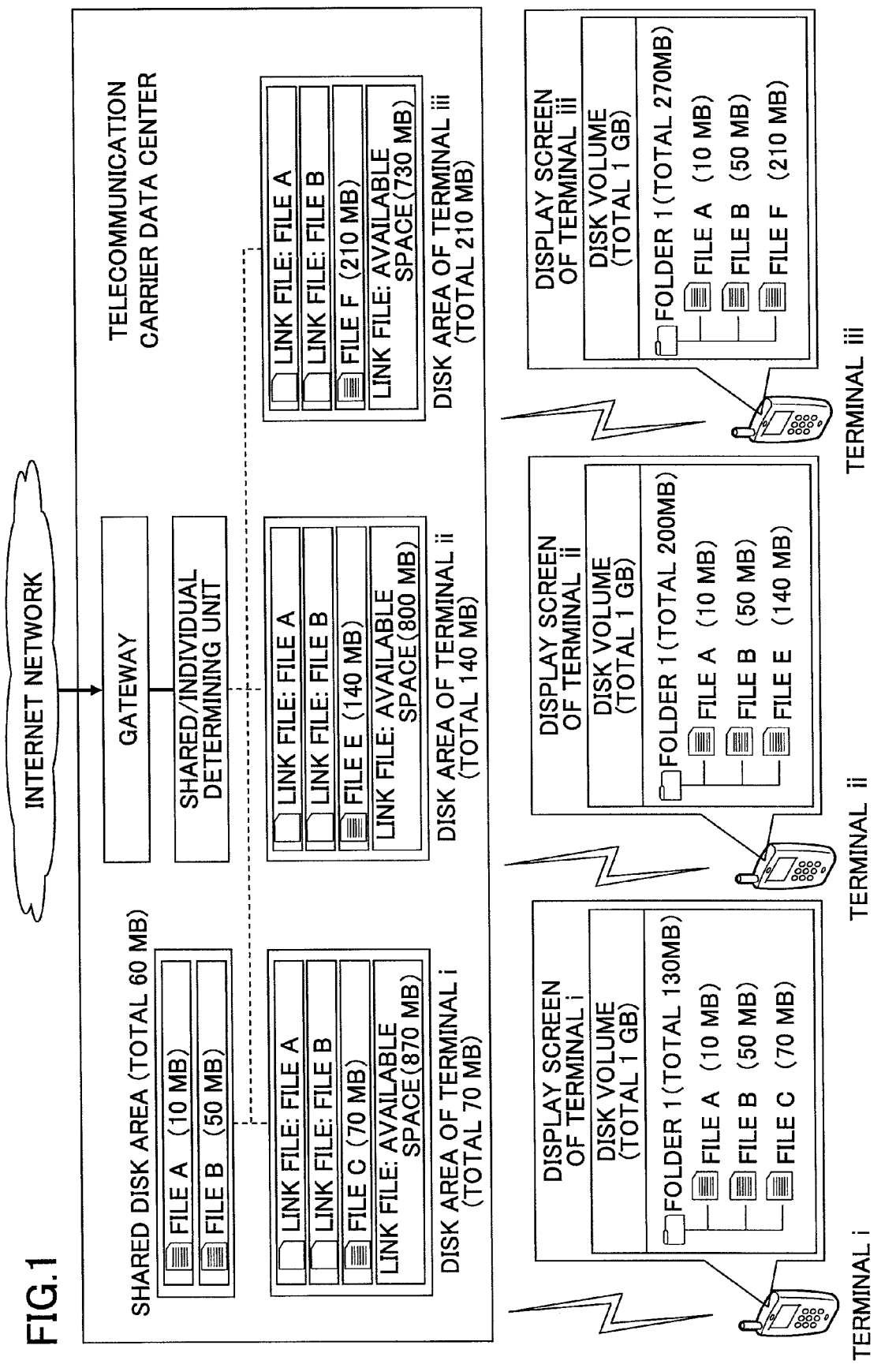
FIG. 1 is a drawing showing a system including a data center provided with a shared disk area.
Figure 2:
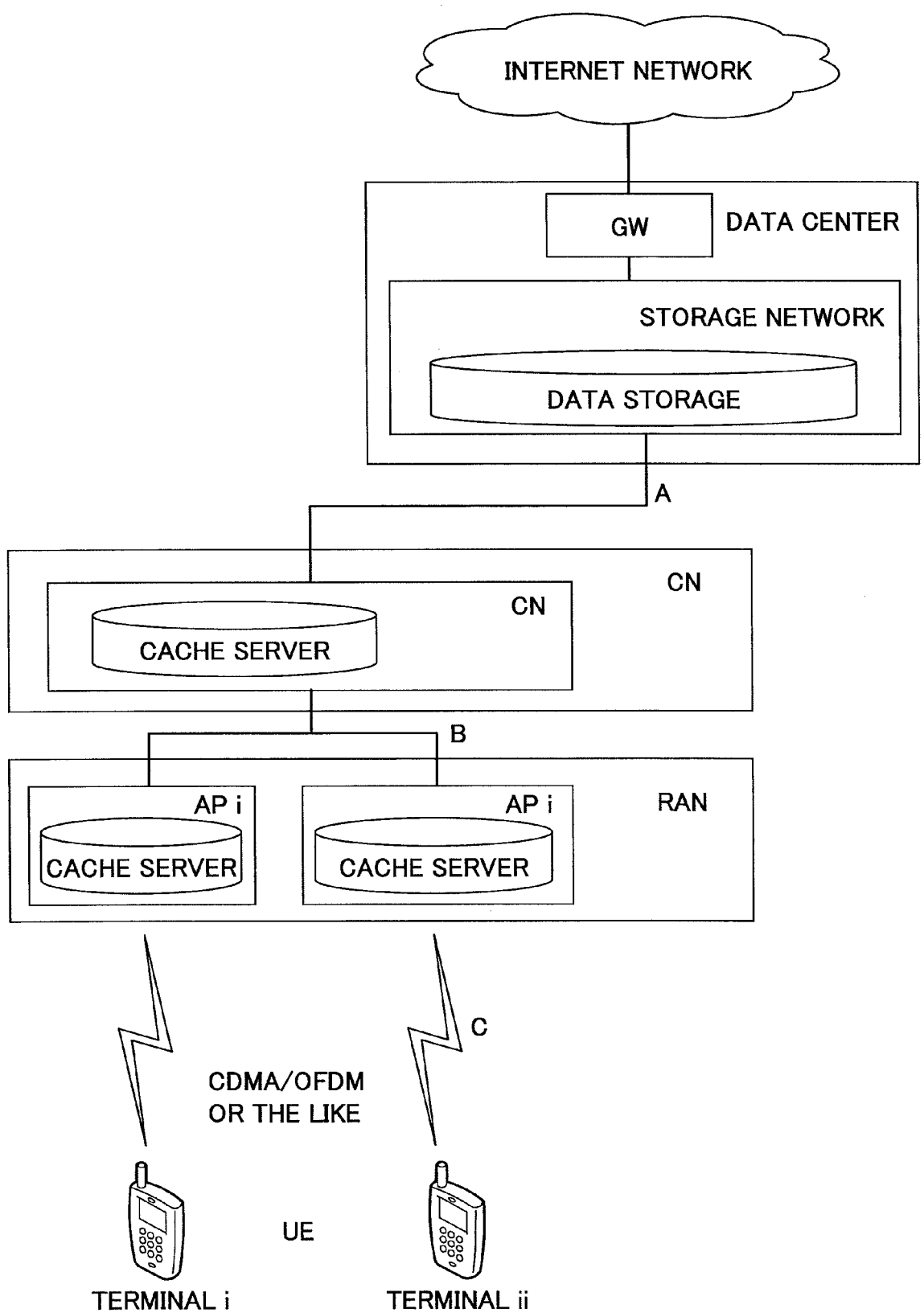
FIG. 2 is a drawing showing a system that has cache servers on CN and RAN.

In the following, embodiments of the present invention will be described with reference to the accompanying drawings.

According to an embodiment of a system of the present invention, a data center connected to a core network receives data from an external node when a user attempts to download the data from such external node existing on the Internet, for example. The received data is classified into shared data or individual data (unique data). The data center is run by a telecommunication carrier. The storage space in the storage network of the telecommunication carrier is divided at least into a shared disk area and an individual disk area. Files for shared use by a plurality of terminals are stored in the shred disk area, and files specific to each terminal are stored in the individual disk area on a terminal-specific basis. Data stored in the storage areas are transferred to a cache server provided in the RAN or CN according to instruction given by the data center.

An access path PATH pointing to a file (e.g., file A) stored in the shared disk area is stored as a link file LinkFile in each of the individual disk areas provided in one-to-one correspondence to the terminals. Accessing the link file LinkFile allows access to be made to the file A. As for the individual data, the actual data contents of each file, as opposed to a link file, is stored in the individual disk areas.

In an embodiment of the present invention, the shared disk area and individual disk area serve as storage spaces for original data, rather than serving as cache. In this embodiment of the invention, caches are used for nodes provided in the RAN or CN.

A user having a mobile terminal can use the display screen of the terminal to access data that has already been stored. For example, all the files that the user has downloaded before may be displayed on the display screen of the terminal along with the disk size that is allocated to the user according to the contract. The display screen may also display an available space that can be used for further storage. An available space does not have to be an actually allocated space corresponding to the indicated size. Moreover, a link file LinkFile may be provided that records the size of the available space, and the terminal may read this size to display the size of the available space on the display screen of the terminal. In response to an action on the display screen of the terminal to delete a file (e.g., file A) that is stored in the shared disk area, the actual contents of the file may not be deleted, but only the link file LinkFile may be deleted. The actual contents of the file may be deleted when no link points to this file any longer.

According to an embodiment of the present invention, an appropriate arrangement of cache data is achieved in accordance with the network characteristics of the RAN or CN. For example, data with little tolerance for delay or data of large size such as streaming video data or streaming audio data are cached on the RAN side as much as possible, and data with high tolerance for delay or data of small size such as still images or programs are cached on the CN side as much as possible. With this arrangement, the efficiency of cache is improved to maintain the quality of network service at proper level. Data for which frequent sharing between terminals is desired is distinguished as shared data, and is preferentially cached so as to improve a hit rate.

In an embodiment of the present invention, a primary cache area (i.e., primary cache server) may be provided for the purpose of storing data transferred from the data center according to a data arrangement list independent of data acquisition requests issued from users, and a secondary cache server may also be provided for the purpose of storing data transferred from the data center in response to a data acquisition request issued from a user. When the primary cache serves in the RAN and CN do not have data desired by a user, for example, the data center transfers such data to a secondary cache server situated in the RAN. The user accesses this secondary cache server to acquire the desired data. The use of both a primary cache server and a secondary cache server makes it possible to hit data after the data is stored in the secondary cache server, thereby improving a cache hit rate. In the absence of such secondary cache server, the user needs to directly access the original data stored in the data center to acquire the data each time, which does not contribute to the improvement of the cache hit rate.

According to an embodiment of the present invention, the data center may determine cache data arrangement conditions in response to the capability (including data storage capacity) of an access point AP on the RAN side. For example, cache optimization may be achieved by providing data of large file size preferentially for an AP having a broad bandwidth.

First Embodiment

Figure 3:
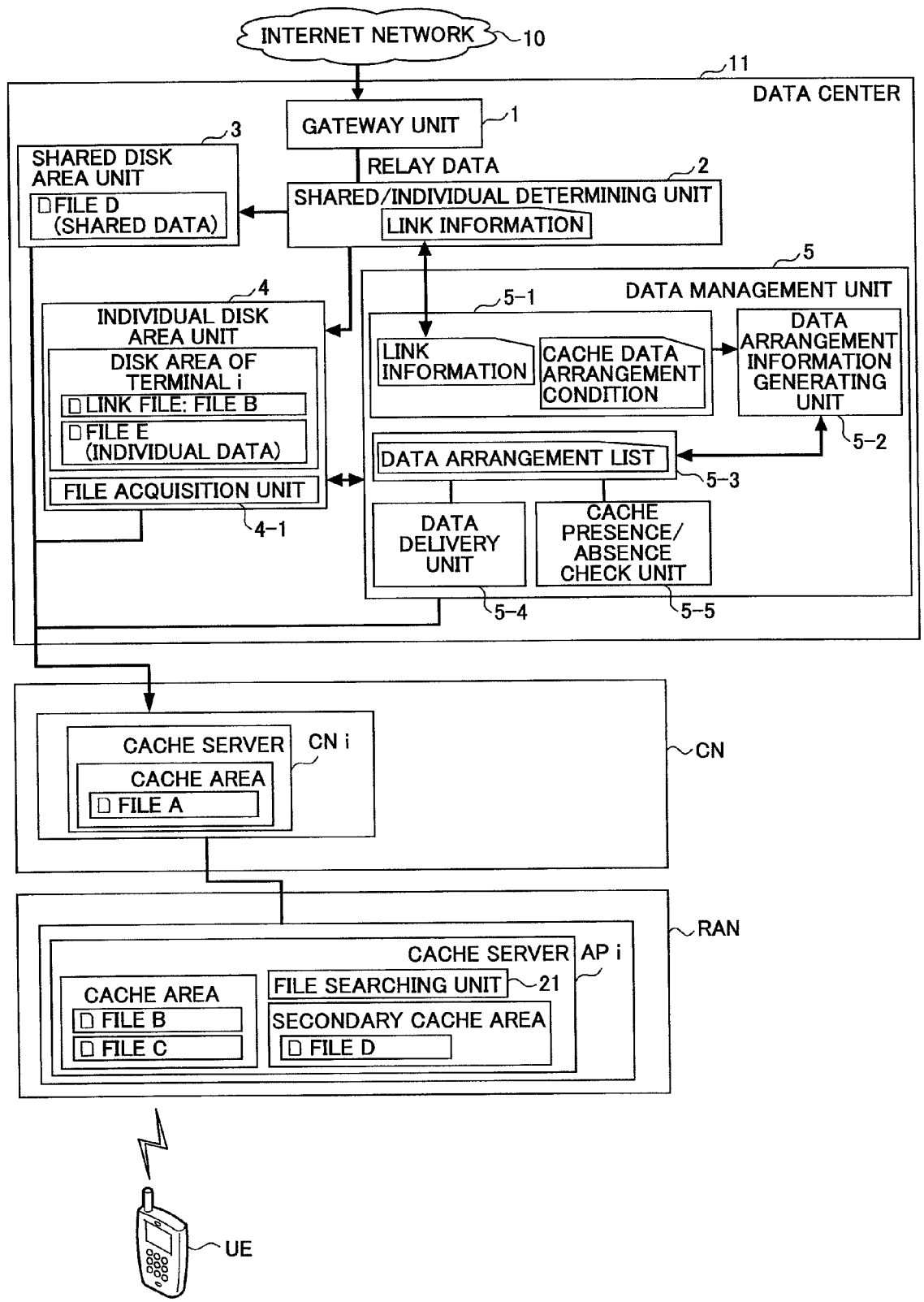
FIG. 3 is a drawing showing a system according to an embodiment of the present invention.

FIG. 3 is a drawing showing a system according to an embodiment of the present invention. The system of FIG. 3 includes an Internet network 10, a data center 11, a core network CN, a radio access network RAN, and a user apparatus UE.

The Internet network 10 is connected to a gateway provided in the data center 11. The user apparatus UE can acquire a desired file from any proper node situated on the Internet network 10 through the gateway. The Internet is used as an example for the sake of convenience of explanation. In place of the Internet, any network may be used that can be accessed for data acquisition by the user apparatus UE.

The data center 11 has the function to store files that the user apparatus UE has obtained from the Internet network 10 while distinguishing these files into shared data and individual data, and also has the function to transfer the stored data to cache servers provided in the CN and RAN. In order to implement these functions, the data center 11 includes a gateway unit 1, a shared/individual determining unit 2, a shared disk area unit 3, an individual disk area unit 4, and a data management unit 5. The data management unit 5 includes determination criterion information 5-1, a data arrangement information generating unit 5-2, a data arrangement list 5-3, a data delivery unit 5-4, and a cache presence/absence check unit 5-5.

The gateway unit 1 is situated between the Internet network 10 and the shared/individual determining unit 2, and serves to receive and relay data requested by the user apparatus UE.

The shared/individual determining unit 2 determines whether data obtained from the Internet network 10 is shared data or individual data. Such determination may be made in response to whether the same data as the data of interest has been obtained before on several occasions by the user requesting the data of interest or by other users. If the data is already stored in the shared disk area unit 3, a link file LinkFile recording a route or path leading to the data stored in the shared disk area unit 3 may be transmitted to the individual disk area of the user, rather than transmitting the data itself. If the data is not already stored in the shared disk area unit 3, the data is transferred to the individual disk area. The shared/individual determining unit 2 keeps record of the attributes and statistics of received data such as the number of delivered link files, the file size of original files, data types, and stores such record as link information.

The shared disk area unit 3 stores data that are shared by a plurality of user apparatuses (i.e., the data that are stored and requested by a plurality of users). Such data may be stored in the shared disk area unit 3 as a result of the determination by the shared/individual determining unit 2 determining the data as shared data. The shared data may be accessed by a terminal by use of the path specified in the link file for download to the terminal.

The individual disk area unit 4 stores data that are used individually by user apparatuses (i.e., the data that are stored and separately requested by respective users). Such data include the actual contents of unshared (individual) data that are not stored in the shared disk area unit 3, and also include link files pointing to the shared data. Such data is accessed by a terminal, and is downloaded to the terminal from a primary cache area or secondary cache area, which will later be described. A file acquisition unit 4-1 receives a file acquisition request from a terminal, and finds the location that should be accessed by the user in order to acquire the file, followed by informing the user of the location for file acquisition.

In the embodiment of the present invention, the shared disk area and individual disk area are not referred to as cache, and are intended to mean storage spaces for original data. In this embodiment of the invention, the term "cache" is used to refer to nodes provided in the RAN or CN.

It should be noted that the classification of given data as being shared data or individual data does not have to be fixed, and may change as appropriate depending on the situation.

Figure 4:
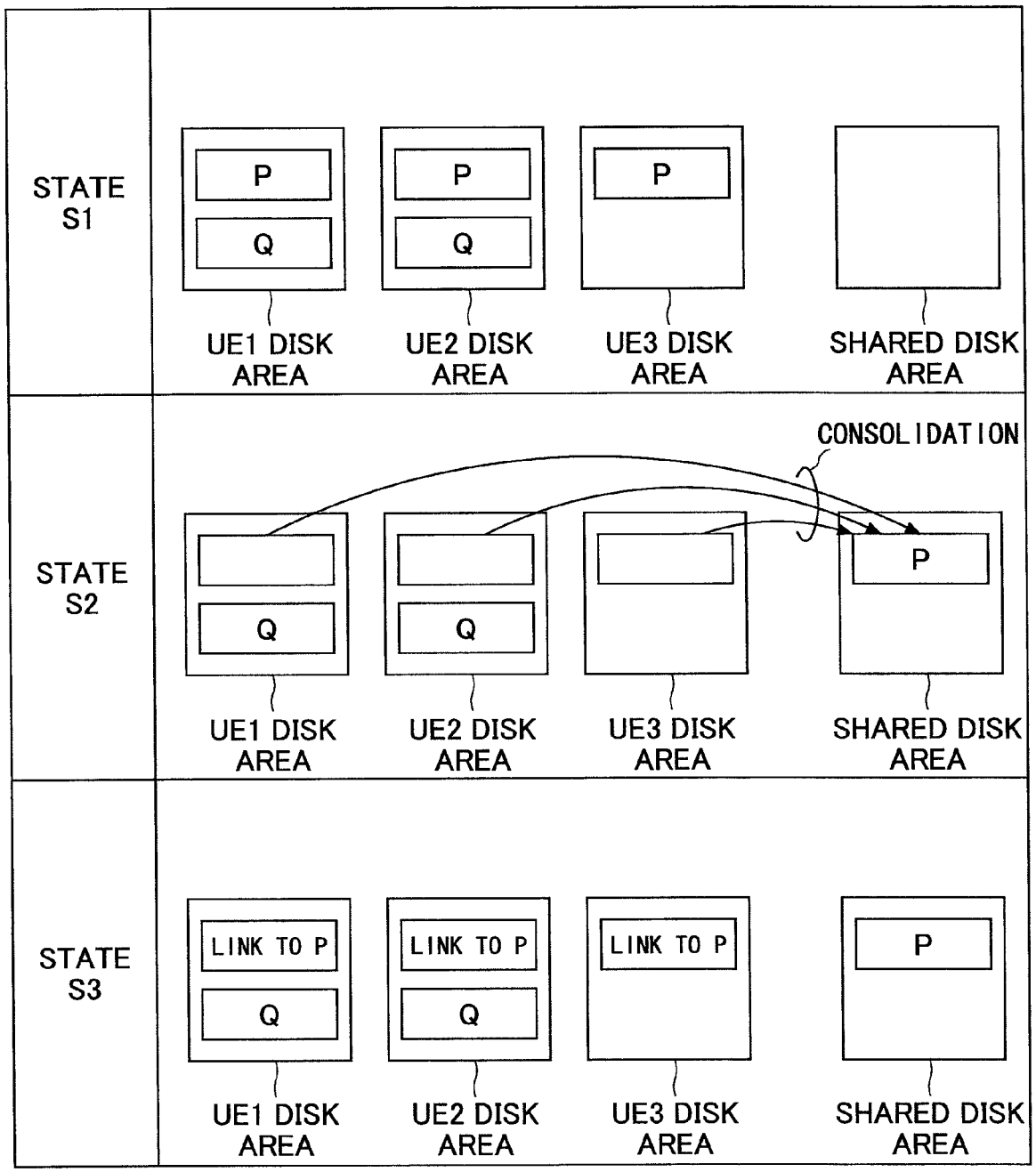
FIG. 4 is a drawing showing the updating of attributes of share data and individual data.

FIG. 4 is a drawing showing the way the attribute of a file is changed from individual data to shared data. For the sake of convenience of explanation, it is assumed that no data is stored in the shared disk area and individual disk area. The attribute of data is shared data when more than a predetermined number of users (e.g., three or more users) have downloaded such data, and is otherwise individual data. It is assumed that the system starts operation from this initial state. Thereafter, a user downloads data through the Internet. Since all data are individual data at this point in time, all the data received by the data center 11 through the gateway are directly stored in the individual disk area.

A state S1 shown in FIG. 4 illustrates a current state after the operations as described above. As a result of the day's operations, a first user UE1 has data P and Q, a second user UE2 having data P and Q, and a third user UE3 having data P, all of which are stored as individual data.

A state S2 shows the rewriting of data performed at a predetermined hour such as 4:00 pm. In this example, the data P has been downloaded by three users, so that the attribute of the data P is changed to shared data. As a result, the data P is copied to the shared disk area, and the data P in each individual disk area is removed. In place of the removed data, a link file pointing to the data P is written to each user's individual disk area.

A state S3 shows the current state after the consolidation of data shown in the state S2 is completed. As shown in the drawing, the users UE1, UE2, and UE3 do not own duplicate copies of the data P, and only one copy of the data P is stored in the shared disk area. If the data center 11 thereafter receives the same data as the data P, the received data is treated as shared data.

The updating of data attributes as shown in the state S2 may be performed regularly or on an irregular basis. When the first user UE1 later removes the data P (i.e., removes the link file pointing to the data P), the data P ends up being shared by only two users, resulting in the attribute of the data P being changed from the shared data to the individual data. In this case, an operation that is reverse to the operation shown in the state S2 is performed. Namely, the data P stored in the shared disk area is copied to the individual disk areas of the second and third users UE2 and UE3, and is then removed from the shared disk area. If the third user UE3 downloads and stores the data Q after the state S3, the attribute of the data Q will be changed from the individual data to the shared data at the next updating operation. In this manner, the attribute of data may constantly change.

The data management unit 5 shown in FIG. 3 determines, based on the statistics of the data received by the data center 11 and predetermined conditions, whether the received data should be cached and which cache server, if any, should be used. In response to a data acquisition request from the user apparatus, the data management unit 5 notifies the user apparatus of the location in which the data of interest is stored.

The determination criterion information 5-1 includes link information and cache data arrangement conditions. The link information is acquired from the shared/individual determining unit 2. The link information includes the attributes and statistics of received data such as the number of delivered link files, the file size of original files pointed to by the link files, and the data types of these original files. The cache data arrangement conditions are determined in advance before the receipt of data. The cache data arrangement conditions include various parameters such as the capacity of a cache server, the limitation of data size, the priority levels of data types, all of which are provided separately for each cache server.

The data arrangement information generating unit 5-2 generates the data arrangement list 5-3 based on the determination criterion information 5-1 (link information and cache data arrangement conditions). The data arrangement list 5-3 indicates which file should be delivered to which cache server (the algorithm for this will later be described). The data arrangement list 5-3 may as well be used to check whether data of interest is already stored in a cache server. The contents of the data arrangement list 5-3 may be represented by use of a data name, a path, presence/absence of data, etc.

The data delivery unit 5-4 delivers the files stored in the shared disk area unit 3 to cache servers provided in the RAN or CN according to the data arrangement list 5-3.

The cache presence/absence check unit 5-5 responds to a cache-data-presence/absence check request received from the file acquisition unit 4-1 of the individual disk area unit 4 by returning a check result indicating the presence/absence of cache data. If the requested file is already stored in a cache server, a path pointing to the cache server where the requested file is stored will also be included in the response.

The core network CN performs various control such as call control, move management, and accounting management with respect to a portable telephone network such as 3G/4G/WiMAX, but does not perform radio control. In this embodiment, a cache server CNi is provided in the core network CN. The cache area of this cache server CNi is only used to store cache data transferred from the data center 11. This cache server CNi may output data in response to a data download request issued from a terminal.

The radio access network RAN performs various radio control such as the control of radio resources and handover control with respect to the portable telephone network such as 3G/4G/WiMAX. In the embodiment of the present invention, a cache server APi is provided in the radio access network RAN (at an access point of the RAN to be exact). The cache server APi has a primary cache area and a secondary cache area, both of which serve to store data transferred from the data center 11. The primary cache area is used to store data transferred according to the data arrangement list 5-3 that specifies the cache data arrangement of one or more data pieces irrespective of data acquisition requests issued from individual users. The secondary cache server is used to store data that is transferred in response to a data acquisition request issued from a user. The cache server APi also includes a file searching unit 21 for searching the secondary cache area for data specified by the data center 11. This cache server APi may output data in response to a data download request issued from a terminal. The file searching unit 21 performs a file search in the secondary cache area in response to a request from the cache presence/absence check unit 5-5. The file searching unit 21 sends a response indicating a path leading to a desired file if such file is already stored, and otherwise sends a response indicating the absence of the desired file.

The user apparatus (or user equipment) UE is a terminal used by a user for the mobile communication network such as 3G/4G/WiMAX. The user apparatus UE is typically a portable phone, but may alternatively be another type of mobile terminal or even be a fixed terminal. The terminal has the function to download data from the data center 11 so as to play the data. The terminal issues a file acquisition request to the individual disk area unit 4. A file is downloaded from the shared disk area, the individual disk area, the cache server of the CN, or the cache server of the RAN.

In the following, an example of operations according to the embodiment of the present invention will be described. The operation example may be divided into a procedure for storing data in the cache server that is performed prior to the acquisition of data by the user and a procedure for accessing the stored data from the user apparatus that is performed when the user actually acquires the data.

[Procedure for Storing Data in Cache Server]

Figure 5:
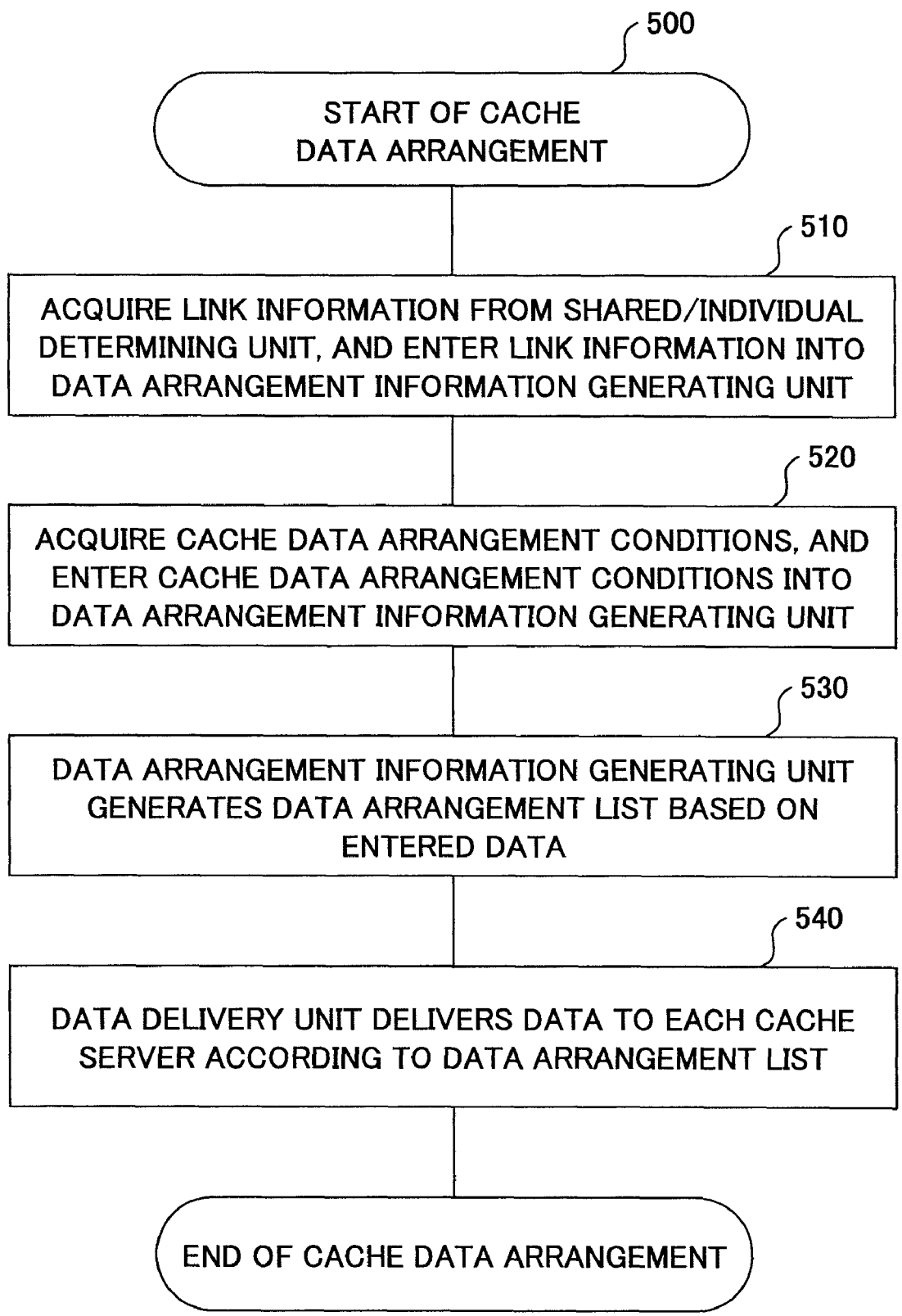
FIG. 5 is a flowchart showing an example of operations according to an embodiment of the present invention.

FIG. 5 is a flowchart showing an example of the operation for storing data in the cache server that is received by the data center 11. It is assumed that the data center 11 classifies received data into shared data and individual data according to the procedure as described in connection with FIG. 4, and updates the attributes of data at appropriate timing. The procedure starts at step 500 and proceeds to step 510.

At step 510, the shared/individual determining unit 2 of the data center 11 generates or acquires link information regarding the shared data, and enters the link information into the data arrangement information generating unit 5-2 of the data management unit 5. The link information may include a data name, a path, the number of delivered link files, the file size of an original file pointed to by the link files, the data type of the original file, etc.

FIG. 6 is a drawing showing an example of data and parameters obtained at the step 510. A data name, a path, the number of delivered link files, the file size of an original file, and the data type of the original file are listed separately for each file A, B, and C. The data name may be represented by information usable for file identification. The path may be represented by information indicating how to reach the storage location. The number of delivered link files indicates how widely the file has been distributed up to now. This information may indicate that a popular music data file such as files A and C has been downloaded by 100 people up to this point, whereas another music data file such as file B has been downloaded only by 50 people so far. The data type of an original file pointed to by a link file may be classified based on such criteria as QoS (quality of service) and the degree of tolerance for delay. For example, data types may be defined such as a type #1 being video streaming, a type #2 being an audio streaming, a type #3 being non-streaming video, a type #4 being non-streaming audio, a type #5 being a program, and a type #6 being other types of data. As will later be described, priority is determined based on the data type.

At step 520 shown in FIG. 5, the cache data arrangement conditions are entered into the data arrangement information generating unit 5-2. For the sake of convenience of explanation, the step 520 is shown as being performed after the step 510 in FIG. 5. This order is not limiting, and may be reversed. Alternatively, part or all of these steps may overlap each other. The cache data arrangement conditions indicate what criteria are used to cache data in each cache server. In the case of the RAN (AP), the criteria or conditions for caching may require that the data size be small and that the demand for streaming is high (i.e., real-time data). In the case of the CN, the criteria or conditions may require that the data size be large and that there is only a low demand for streaming. The capacity (volume) of a cache server APi on the RAN may be relatively small due to the limitation to the size of apparatus, and may be around 100 GB, for example. On the RAN, a portion (e.g., 10 GB) of the 100-GB storage space may be allocated to the secondary cache area. In order to prevent a large data file from occupying the cache space (memory space) of the cache memory, some limitation may be imposed on the size of data to be cached. For example, the data size of each file cached on the RAN may be limited to 1 GB or less. The capacity of a cache server on the CN may be 10 TB, for example, and the data size of each file cached on the CN may be limited to 10 GB or less. The secondary cache area may not be provided on the CN.

FIG. 7 is a drawing showing an example of cache data arrangement conditions regarding each cache server. In this example, cache servers CNi, CNii, and so on are provided on the CN, and cache servers APi, APii, and so on are provided on the RAN. The capacity of a cache server, the sizes of the primary and/or secondary cache areas, the limitation to data size, and data-type-specific priority are defined separately for each cache server. The items for representing the cache data arrangement conditions are not limited to those of the illustrated example, and more or fewer items may alternatively be provided.

On the CN, a cache server having relatively large capacity may be provided, and the limit to the file size may also be set to a large value. The data-type-specific priority may provide that data with a low demand for streaming is stored on the CN since the delay of the CN tends to be longer than the delay of the RAN in response to a request from the user apparatus UE.

On the other hand, only a cache server having relatively small capacity may be provided on the RAN, so that the limit to the file size should be set to a small value. Unlike the case of the CN, a secondary cache server may be provided on the RAN. The data-type-specific priority may provide that data with a high demand for streaming is stored on the RAN since the delay of the RAN in response to a request from the user apparatus UE is short.

In the illustrated example, the data type #1 corresponding to video streaming and the data type #2 corresponding audio streaming are set to high priority on the RAN, but are set to middle priority on the CN. On the other hand, the data type #3 corresponding to non-streaming video and the data type #4 corresponding non-streaming audio are set to middle priority on the RAN, but are set to high priority on the CN. The data type #5 corresponding to program and the data type #6 corresponding to other types of data are set to low priority on both the CN and the RAN. The priority is classified into three levels for the sake of convenience of explanation in this example. This example is not intended to be limiting, and more or fewer priority levels may be used. In any event, the data set to high priority on the RAN should not be set on the CN to as high priority as on the RAN. Further, the data set to high priority on the CN should not be set on the RAN to as high priority as on the CN.

At step 530 shown in FIG. 5, the data arrangement information generating unit 5-2 generates the data arrangement list 5-3 based on the link information and cache data arrangement conditions.

Figure 8:
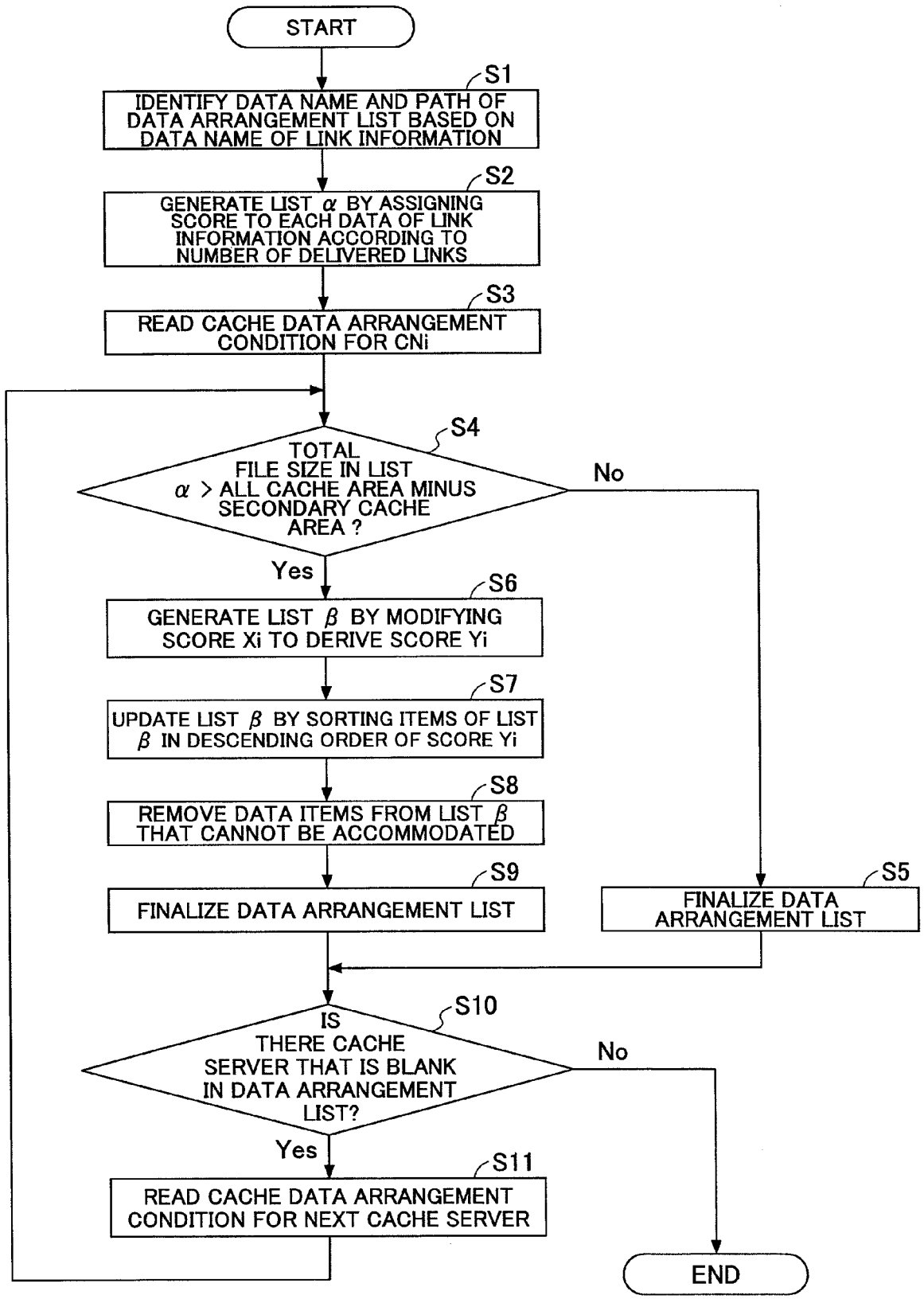
FIG. 8 is a flowchart showing a procedure for generating a data arrangement list.

FIG. 8 is a flowchart showing a procedure for generating the data arrangement list 5-3. The procedure starts at step S1, in which a data name and path are identified based on the link information as shown in FIG. 9. In the illustrated example, paths /DATA/FileA, /DATA/FileB, and /DATA/FileC are specified with respect to three files A, B, and C.

At step S2 shown in FIG. 8, scores Xi are assigned to the data items of the link information such that the larger the number of delivered link files, the higher the score is, thereby generating a list α (data name/file size/data type/score Xi) as shown in FIG. 10. In this example, the score Xi may be set to 100 for the maximum number of delivered link files, and is set to 1 for the minimum number of delivered link files, with settings to corresponding values in the intervening range. In the example shown in FIG. 6, the number of delivered link files is 100, 50, and 100 for files A, B, and C, respectively, so that score "100" is assigned to the maximum number "100", and score "1" is assigned to the minimum number "50". The scores of the files A, B, and C are thus 100, 1, and 100, respectively. If the number of delivered link files is 200, 100, and 150 for the files A, B, and C, respectively, the maximum number is 200, and the minimum number is 100, so that the scores of the files A, B, and C are 100, 1, and 50, respectively. This method of assigning scores is only an example, and any other proper method for assigning scores according to the number of delivered link files may be used.

At step S3 of FIG. 3, the cache data arrangement conditions for a given cache server are read by the data arrangement information generating unit 5-2.

At step S4, a check is made as to whether the total data size of all the files listed in the list α is so large that not all the files can be stored in the primary cache area provided on the CN or RAN.

If all the files can be stored, the procedure goes to step S5, at which the data names in the list α are assigned to data names in the data arrangement list 5-3, and the presence/absence of data arrangement is set to "presence" (i.e., the flag indicating that the file of interest is cached is set to ON), with the path indicative of the storage location being recorded. Further, the presence/absence of data arrangement is set to "absence" with respect to the files that are not listed on the list α (i.e., the flag indicating that the file of interest is cached is set to OFF), and no path is recorded.

FIG. 11 is a drawing showing an example of the data arrangement list 5-3. As shown in FIG. 11, paths are recorded with respect to the data files that are cached (as indicated by "presence"). Although cache states are shown in FIG. 11 with respect to four cache servers CNi, CNii, APi, and ANii, entries are recorded at the step S5 with respect to only a single cache server. As the procedure following the step S4 shown in FIG. 8 is repeated for each cache server, the data arrangement list 5-3 as shown in FIG. 11 will be obtained.

At step S6 of FIG. 8, the scores Xi of the list α are adjusted to other scores Yi to generate a list β when it is confirmed at the step S4 that not all the files can be stored. The scores Yi are assigned such that the higher the data-type-specific priority, the higher the score is. For example, a score Xi in the list α may be doubled (Yi=2Xi) if the data-type-specific priority is high, may be multiplied by 1.5 (Yi=1.5Xi) if the data-type-specific priority is middle, and may be multiplied by 1 (Yi=1Xi) if the data-type-specific priority is low. With respect to the cache server of interest, the data-type-specific priorities for the files A, B, and C (corresponding to the data types #1, #3, and #4, respectively) shown in the list α of FIG. 10 may be middle, high, and high, respectively, as shown in the rows of CNi and CNii in FIG. 7. In this case, as shown in FIG. 12, the scores Yi in the list β are 150 (1.5×100), 100 (2×50), and 200 (2×100). The method of converting the scores Xi into the scores Yi described above is only an example, and any other values and/or any other conversion rules may be used.

At step S7 of FIG. 8, the rows in the list β are rearranged in a descending order of scores Yi. FIG. 13 is a drawing showing the rearranged list β.

At step S8, data items are removed from the list β in the order from the bottom row of the list, such that all the data remaining in the list can be stored in the cache server. As shown in FIG. 14, some data items are removed from the list β at the bottom of the list, and the remaining data items are stored in the cache server.

At step S9, the data names in the rearranged and trimmed list β are assigned to data names in the data arrangement list 5-3, and the presence/absence of data arrangement is set to "presence" (i.e., the flag indicating that the file of interest is cached is set to ON), with the path indicative of the storage location being recorded. Further, the presence/absence of data arrangement is set to "absence" with respect to the files that are not listed on the list β (i.e., the flag indicating that the file of interest is cached is set to OFF), and no path is recorded. Consequently, fields for the cash server of interest are filled with data entries in the data arrangement list 5-3 as shown in FIG. 11.

At step S10, a check is made as to whether there is a cache server with the corresponding fields being all blank. If there is such a cache server, the cache conditions for the next cache server are read at step S11, and the procedure goes back to the step S4 to repeat the procedure described above.

If the step S10 confirms that the above-described process has been performed with respect to all the cache servers specified in the data arrangement list 5-3, the procedure comes to an end.

Figure 15:
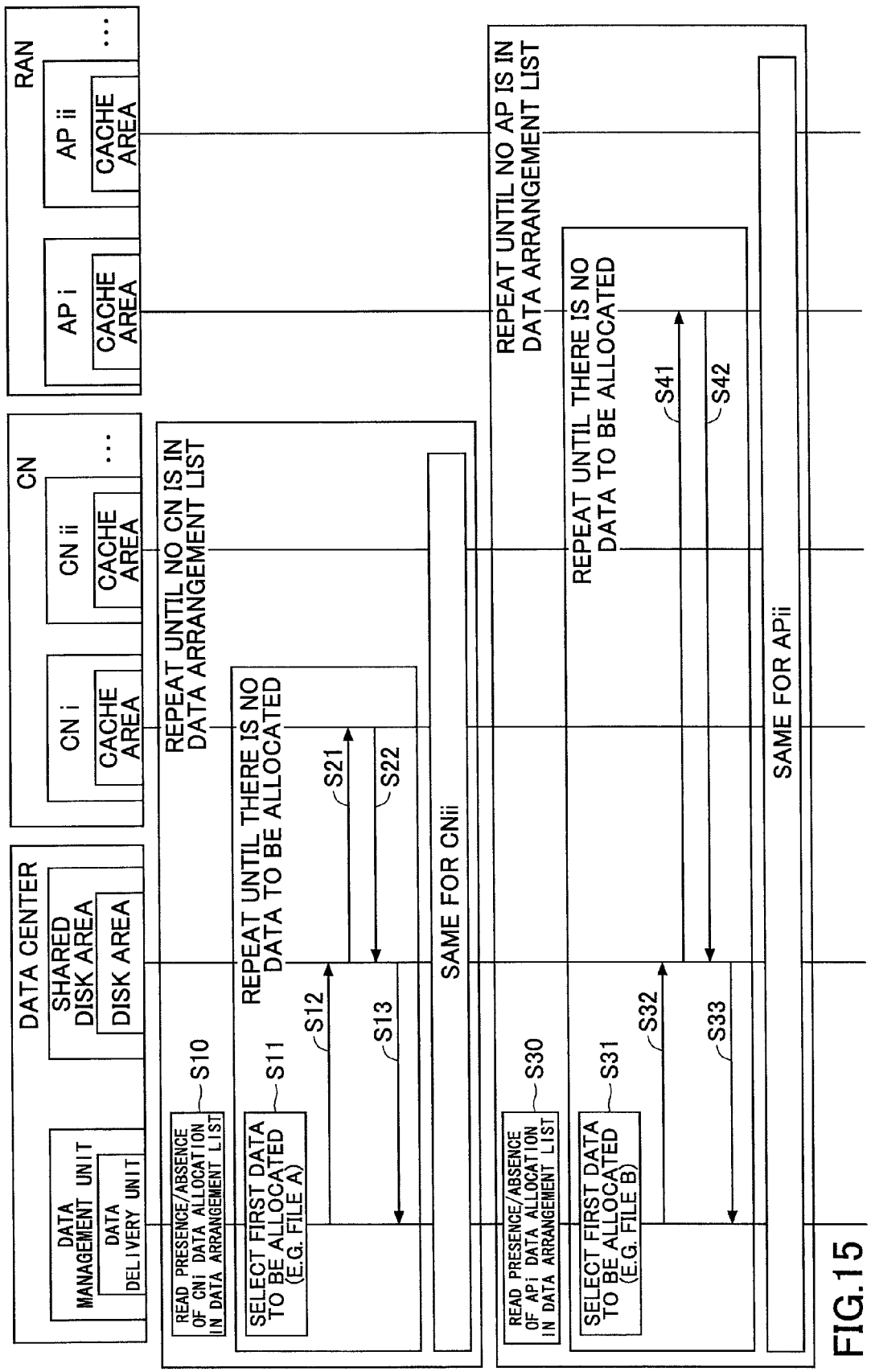
FIG. 15 is a flowchart showing the transfer of data to a cache server according to the data arrangement list.

FIG. 15 is a drawing showing the way the data prepared by the data center 11 are transferred to each cache server situated on the CN or RAN according to the data arrangement list 5-3.

At step S10, the data management unit 5 of the data center 11 reads information about the cache server CNi situated on the core network CN from the data arrangement list 5-3. This information may include a data name, a path, and a path or the like indicative of the cache location.

At step S11, one of the data items to be cached (e.g., file A) is identified.

At step S12, the data delivery unit 5-4 sends an instruction signal to the shared disk area unit 3 so as to transfer the identified data (file A) to the cache location (e.g., /DATA/CNi) specified in the data list.

At step S21, the data (file A) is transmitted from the shared disk area unit 3 to the cache server CNi so as to transfer the identified data (file A) to the cache location (e.g., /DATA/CNi) specified in the data list.

At step S22, a response signal inclusive of information about the success/failure of data transfer performed in response to the instruction signal is sent from the cache server CNi to the shared disk area unit 3.

At step S13, a response signal inclusive of information about the success/failure of data transfer performed in response to the instruction signal is sent from the shared disk area unit 3 to the data delivery unit 5-4. The information about success/failure transmitted at the steps S22 and S13 may include a cache location and data name such as /DATA/CNi/FileA.

In this manner, the data that should be cached in the cache server CNi are properly stored in the cache server CNi. If there is another data that should be cached in the cache server, the same procedure as described above will be performed with respect to this data. Further, the same procedure as described above is performed with respect to other cache servers (i.e., CNii and so on) to ensure that data are cached.

At step S30, the data management unit 5 of the data center 11 reads, from the data arrangement list 5-3, information about the cache server APi situated at the access point of the radio access network RAN. This information may include a data name, a path, and a path or the like indicative of the cache location.

At step S31, one of the data items to be cached (e.g., file B) is identified.

At step S32, the data delivery unit 5-4 sends an instruction signal to the shared disk area unit 3 so as to transfer the identified data (file B) to the cache location (e.g., /DATA/APi) specified in the data list.

At step S41, the data (file B) is transmitted from the shared disk area unit 3 to the cache server APi so as to transfer the identified data (file B) to the cache location (e.g., /DATA/APi) specified in the data list.

At step S42, a response signal inclusive of information about the success/failure of data transfer performed in response to the instruction signal is sent from the cache server APi to the shared disk area unit 3.

At step S33, a response signal inclusive of information about the success/failure of data transfer performed in response to the instruction signal is sent from the shared disk area unit 3 to the data delivery unit 5-4. The information about success/failure transmitted at the steps S42 and S33 may include a cache location and data name such as /DATA/APi/FileB.

In this manner, the data that should be cached in the cache server APi are properly stored in the cache server APi. If there is another data that should be cached in this cache server of interest, the same procedure as described above will be performed with respect to this data. Further, the same procedure as described above is performed with respect to other cache servers (i.e., APii and so on) to ensure that data are cached. In the end, the data stored in the shared disk area are properly allocated to the cache servers provided on the CN or RAN according to the data arrangement list 5-3.

Although the transfer of data to the cache servers on the CN is performed ahead of the transfer of data to the cache servers on the RAN for the sake of explanation, such arrangement is not intended to be limiting. The order may be reversed, and part or all of the steps may be performed simultaneously.

[Procedure for Acquiring Data]

In the following, a description will be given of the procedure performed when a user acquires data that is already stored in a cache server. As was described in connection with FIG. 3, given data is stored in one of the primary or secondary cache servers on the RAN, the cache servers CNi on the CN, and the data center 11.

FIG. 16 is a table that lists five possible data access types. The five types are referred to as patterns 1 through 5 for the sake of convenience. The pattern 1 corresponds to a case in which the data required by a user is in existence in the primary cache area of a cache server on the RAN (which may as well be referred to as a primary cache server). The pattern 2 corresponds to a case in which the data is cached in the cache server CNi. The pattern 3 corresponds to a case in which the data is cached in the secondary cache area of a cache server on the RAN (which may as well be referred to as a secondary cache server). The pattern 4 corresponds to a case in which the data is not cached and thus still stored in the shared disk area. As was previously described, the shared disk area and individual disk area serve as storage spaces for original data, rather than serving as cache. In this embodiment of the invention, the term "cache" is used to refer to nodes provided in the RAN or CN. The pattern 5 corresponds to a case in which the data is not cached but stored only in the individual disk area.

Figure 17:
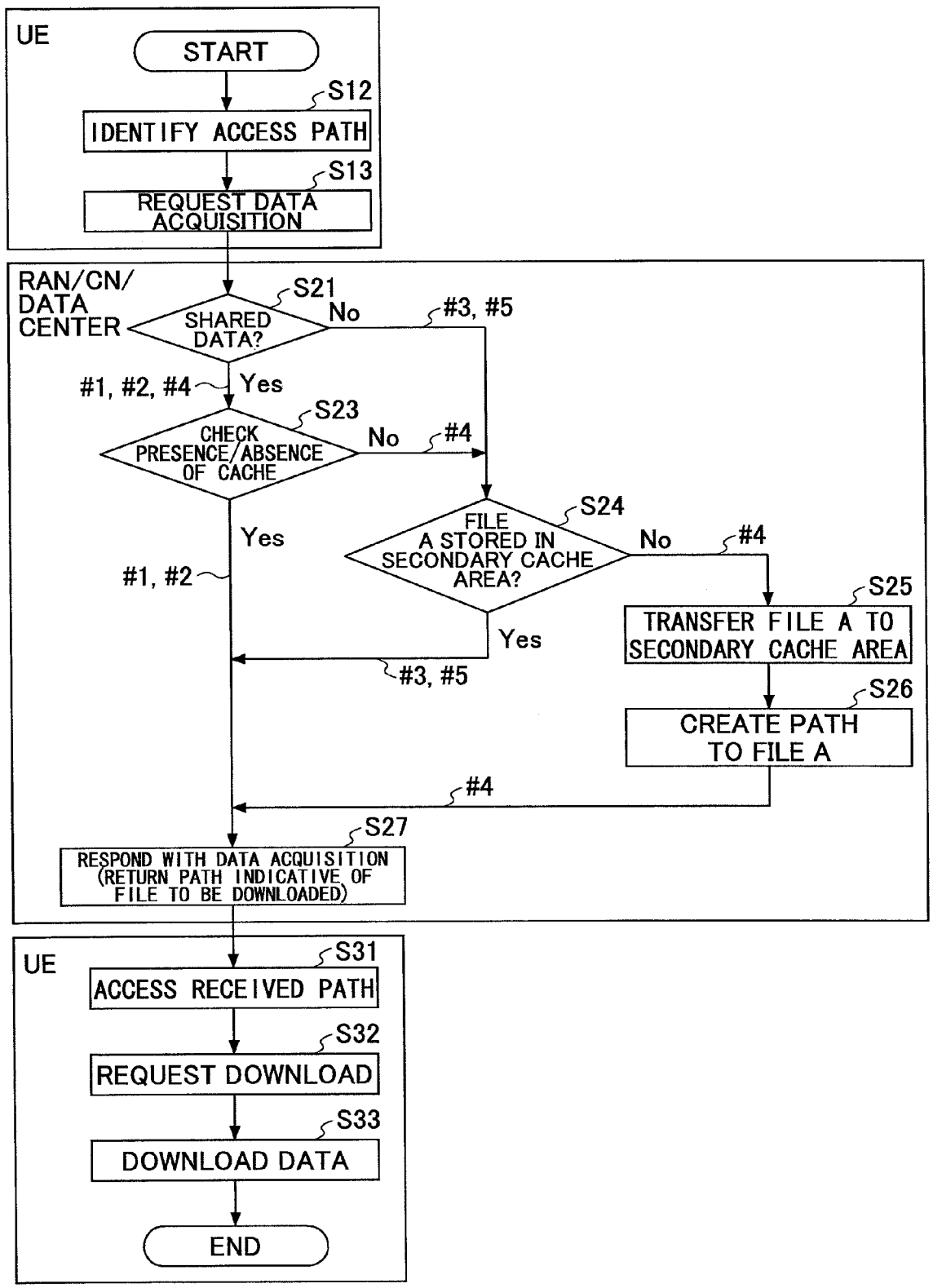
FIG. 17 is a flowchart showing the procedure performed when a user acquires data.

FIG. 17 is a flowchart showing the procedure performed when a user acquires data. At step S12, the user checks an access path. The access path specifies the nodes through which data will be transferred on the core network CN and radio access network RAN between the data center 11 and the user apparatus UE.

At step S13, the user apparatus UE indicates its intention to acquire data (e.g., file A that is shared data). Such intention is announced by sending a data acquisition request signal from the user apparatus to the data center 11.

The step S12 and step S13 are common to all the patterns 1 through 5. In the following description, #1 through #5 are used to refer to pattern numbers.

At step S21, a check is made as to whether the data (i.e., file A in the illustrated example) requested by the user is shared data. Such check is performed by the file acquisition unit 4-1 of the individual disk area unit 4 (provided in the data center 11) corresponding to the user. The procedure goes to step S22 if the requested data is shared data, and goes to step S24 if the requested data is individual data.

At step S23, a check is made as to whether the requested data is already stored in a cache sever situated somewhere along the access path specified by the user. This check is performed by the data management unit 5 (cache presence/absence check unit 5-5) of the data center 11 referring to the data arrangement list 5-3. If the data arrangement list 5-3 indicates that the requested data is stored in the primary cache area of any given node, the procedure goes to step S27, and otherwise goes to step S24.

At step S24, a check is made as to whether the requested data (file A) is stored in the secondary cache area of the access point of the RAN. This check is performed by the file searching unit 21 of the cache server on the RAN in response to an instruction from the data center 11. The procedure goes to step S27 if the requested data (file A) is stored, and otherwise goes to step S25.

At step S25, the requested data is transferred from the shared or individual disk area of the data center 11 to the secondary cache area of the RAN.

At step S26, the path to the file A on the RAN is generated (such as /DATA/APi/Second/FileA).

At step S27, the data location is reported to the user.

At step S31, the user apparatus accesses the data location indicated by the received path.

At step S32, the user requests the downloading of the requested data (file A).

At step S33, the requested data (file A) is downloaded to the user apparatus in response to the download request. With this, the procedure comes to an end. The steps S31 through S33 are common to the patterns 1 through 5.

Figure 18:
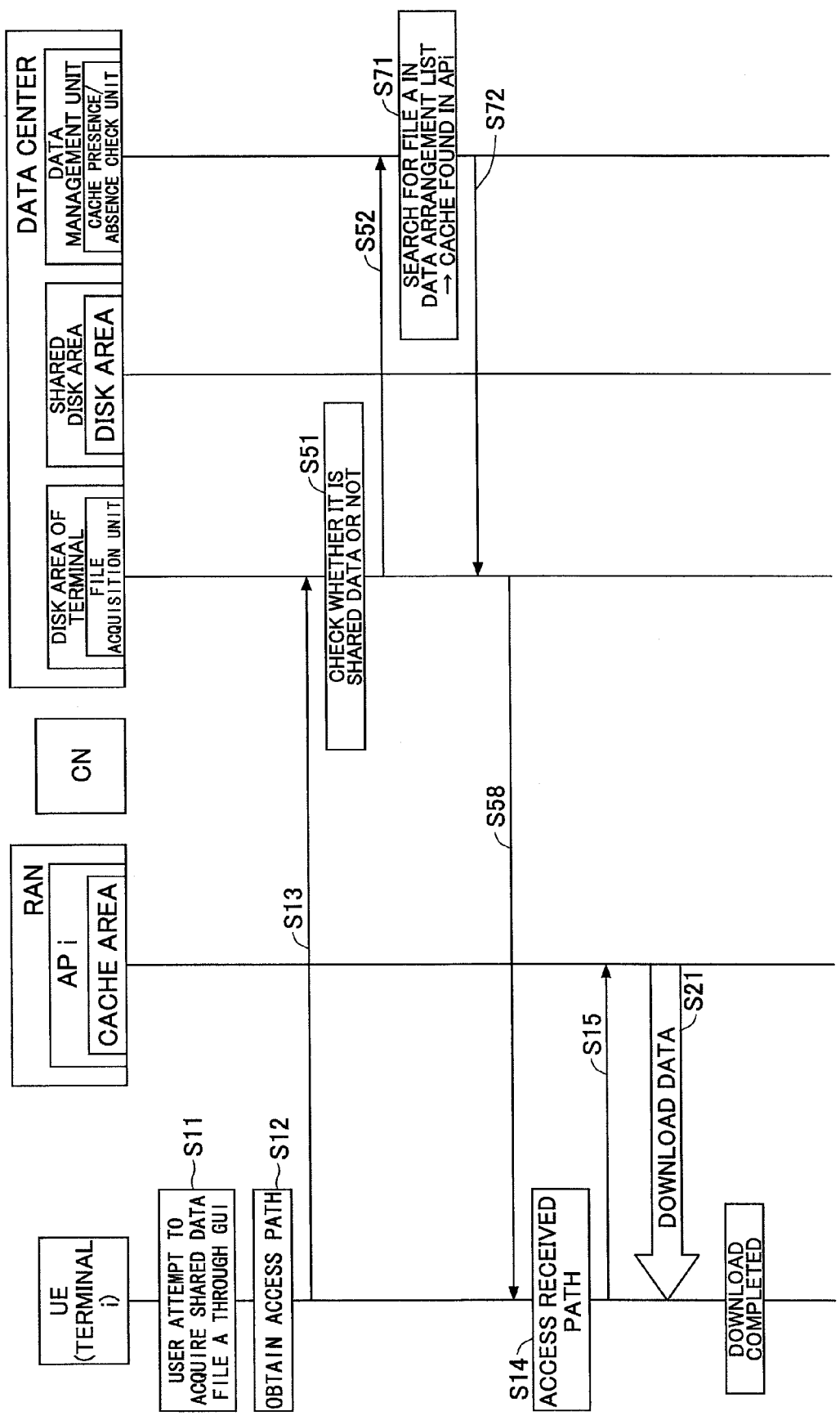
FIG. 18 is a flowchart showing the procedure performed when a user acquires data according to pattern 1.

FIG. 18 is a flowchart showing the procedure performed when a user acquires data in the case of the pattern 1. In the case of the pattern 1, the desired data is shared data, and is already stored in the primary cache area at the access point of the RAN.

At step S11, the user operates the input/output interface of the portable terminal in an attempt to acquire desired data (file A).

At step S12, the nodes through which data will be transferred on the core network CN and radio access network RAN between the data center 11 and the user apparatus UE are identified.

At step S13, the user apparatus transmits a data acquisition request signal to the file acquisition unit 4-1 of the individual disk area unit 4 provided in the data center 11.

At step S51, a check is made as to whether the requested data is shared data. In this example, the requested data is shared data, so that the data might be already cached in some node.

At step S52, the file acquisition unit 4-1 checks with the cache presence/absence check unit 5-5 as to whether the requested data is already cached.

At step S71, the cache presence/absence check unit 5-5 refers to the data arrangement list 5-3 to check whether the requested data is already cached.

At step S72, the cache presence/absence check unit 5-5 transmits a response signal indicative of the presence of cached data to the file acquisition unit 4-1 in this example. This response signal includes information indicative of the data location (e.g., a path such as /DATA/APi/FileA).

At step S58, the information indicative of the data location is reported from the file acquisition unit 4-1 to the user apparatus.

At step S14, the user apparatus accesses the data location. At step S15, the user requests the downloading of the requested data.

At step S21, the requested data (file A) is downloaded to the user apparatus in response to the download request. With this, the procedure comes to an end.

Figure 19:
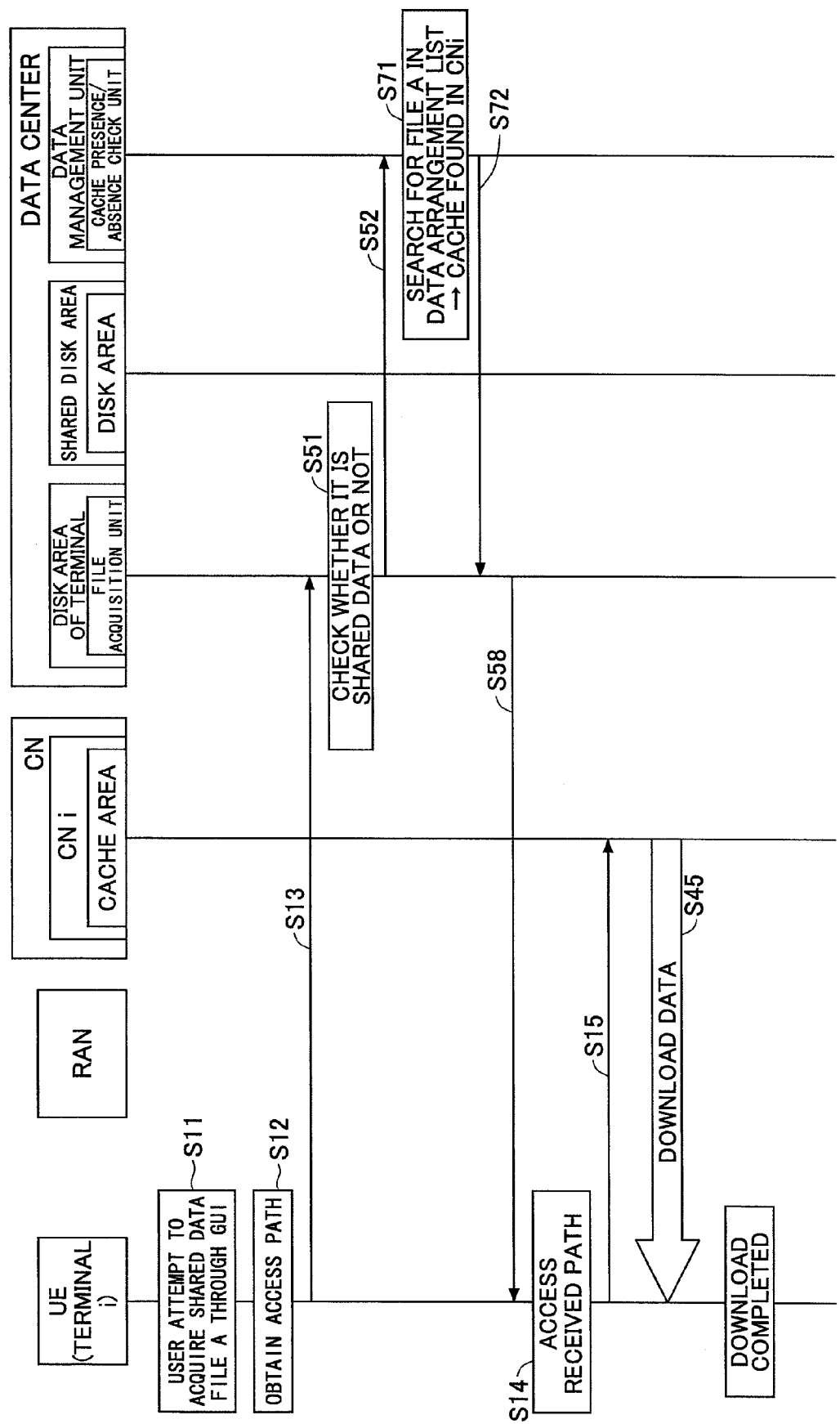
FIG. 19 is a flowchart showing the procedure performed when a user acquires data according to pattern 2.

FIG. 19 is a flowchart showing the procedure performed when a user acquires data in the case of the pattern 2. This flowchart is substantially the same as that of the pattern 1 shown in FIG. 18, except that the data location is on the core network CN.

Figure 20:
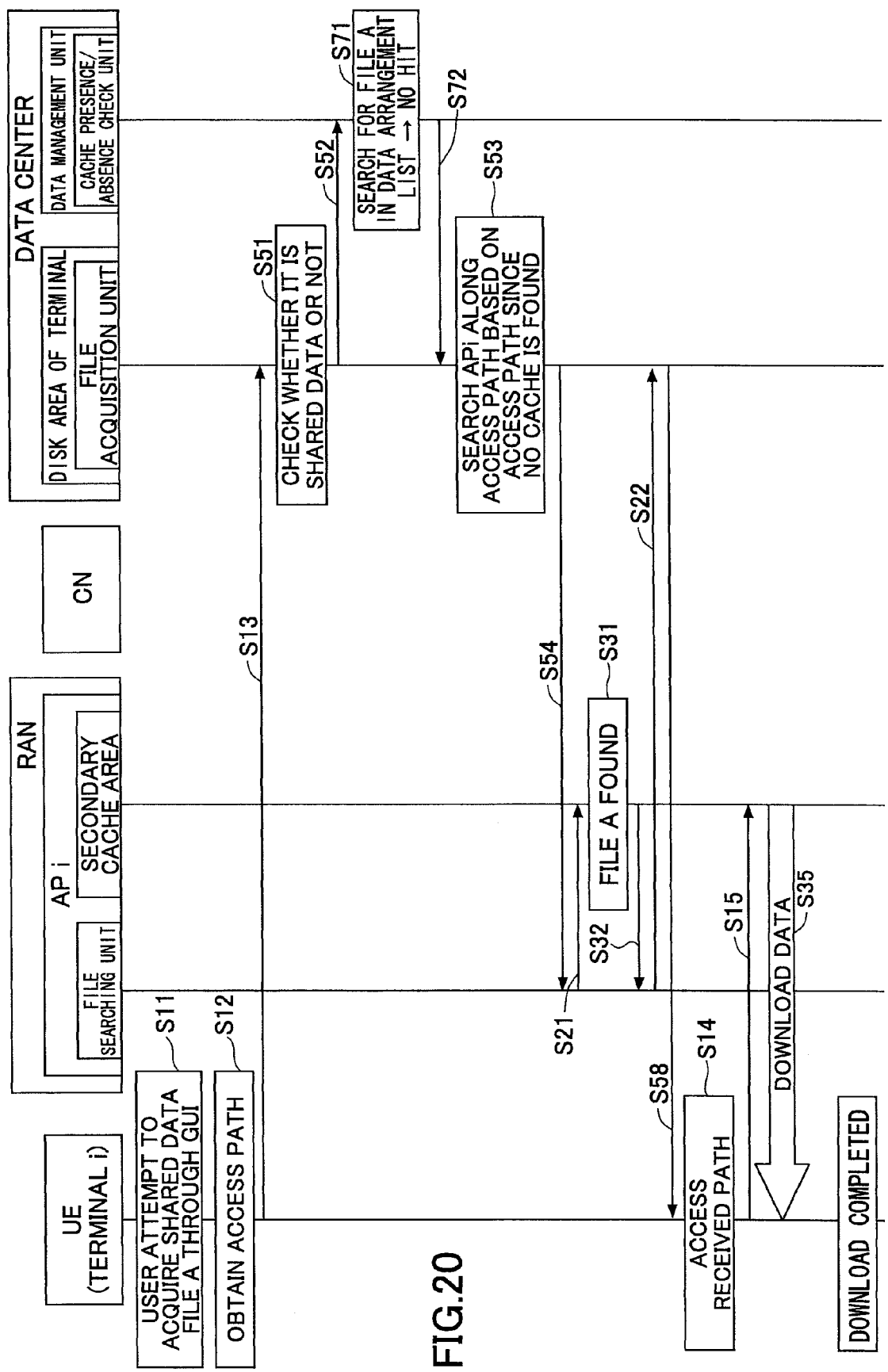
FIG. 20 is a flowchart showing the procedure performed when a user acquires data according to pattern 3.

FIG. 20 is a flowchart showing the procedure performed when a user acquires data in the case of the pattern 3. In the pattern 3, the requested data is cached in the secondary cache area of a cache server on the RAN. Because of this, the requested data cannot be found when the cache presence/absence check unit 5-5 refers to the data arrangement list 5-3 at step S71 to search for the requested data in the same manner as in the case of the patterns 1 and 2 shown in FIGS. 18 and 19. As a result, at step S72, the cache presence/absence check unit 5-5 transmits a response signal indicative of the absence of requested data in any primary cache area to the file acquisition unit 4-1.

At step S53, a check is made as to whether a secondary cache area is provided on the RAN that is situated along the access path for the user apparatus. If a cache server having a secondary cache area along the access path is present on the RAN, the file acquisition unit 4-1 transmits a search request signal at step S54 to the file searching unit 21 on the RAN situated on the access path.

At step S21, the file searching unit 21 on the RAN searches for the requested data in the secondary cache area in response to the search request sent from the data center 11. At step S31, the presence of the requested data is confirmed.

At step S32, the search result indicative of the presence of the requested data is reported to the file searching unit 21, which is then reported from the file searching unit 21 to the file acquisition unit 4-1 of the data center 11.

At step S58, the information indicative of the data location is reported from the file acquisition unit 4-1 to the user apparatus.

At step S14, the user apparatus accesses the data location. At step S15, the user sends a request to download the requested data to the secondary cache area on the RAN.

At step S35, the requested data (file A) is downloaded to the user apparatus in response to the download request. With this, the procedure comes to an end.

Figure 21:
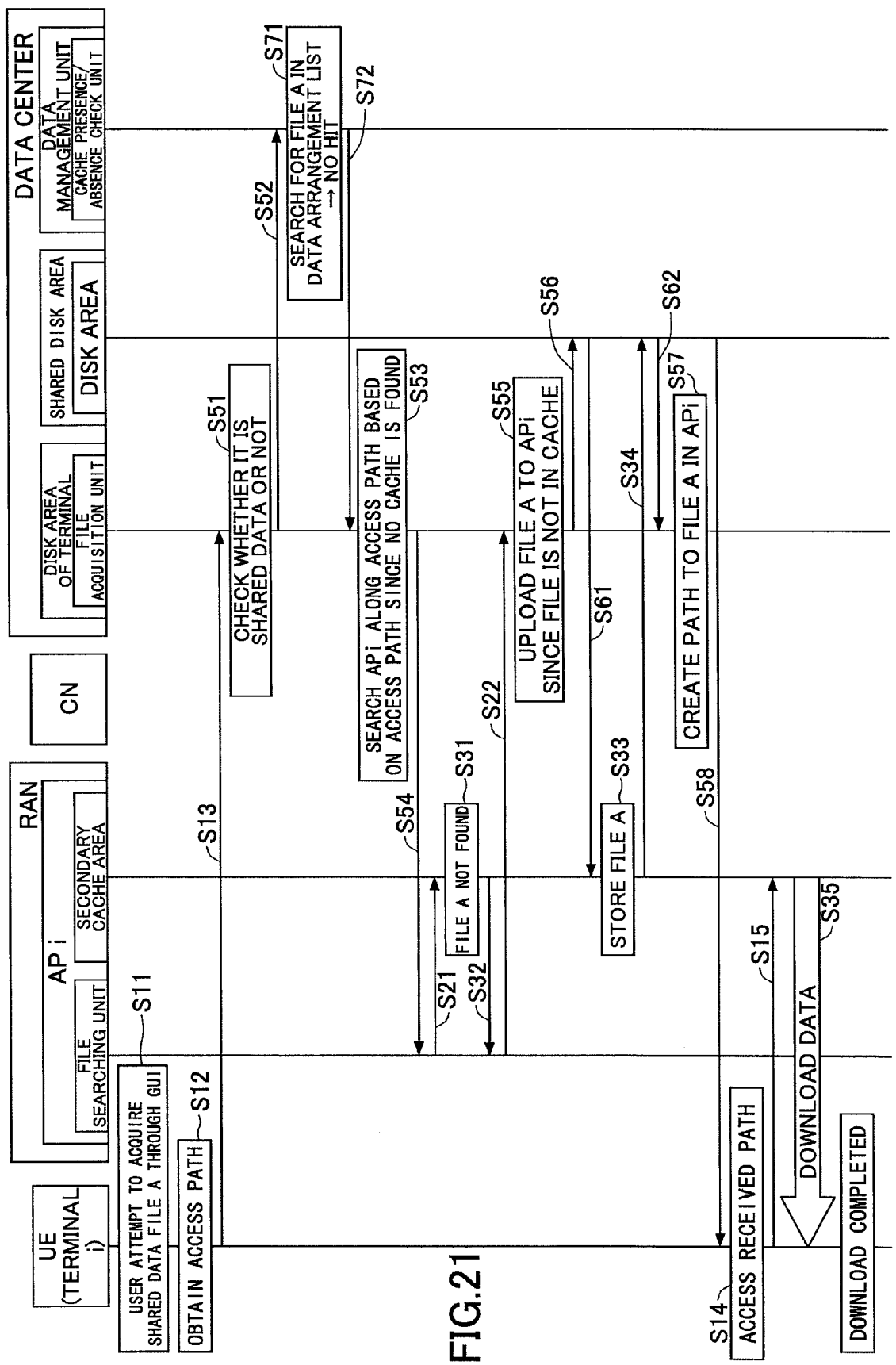
FIG. 21 is a flowchart showing the procedure performed when a user acquires data according to pattern 4.

FIG. 21 is a flowchart showing the procedure performed when a user acquires data in the case of the pattern 4. In the case of the pattern 4, the requested data is stored in neither a primary cache area nor a secondary cache area, and is only stored in the shared disk area. In the same manner as in the case of the pattern 3, a check is made at step S21 and step S31 as to whether the requested data is present in a secondary cache area. In this example, the absence of cached data is confirmed.

At step S32, the search result indicative of the absence of the requested data is reported to the file searching unit 21, which is then reported at step S22 from the file searching unit 21 to the file acquisition unit 4-1 of the data center 11.

At step S55, it is determined that the requested data stored in the shared disk area is to be copied to the secondary cache area on the RAN situated along the current access path.

At step S56, a request signal indicating that the requested data should be transferred to the secondary cache area on the RAN is transmitted from the file acquisition unit 4-1 to the shared disk area.

At step S61, the requested data is transferred from the shared disk area to the secondary cache area of the RAN in response to the request signal.

At step S33, the requested data (file A) is stored in the secondary cache area, and a response signal indicative of the completion of data storing is sent at step S34 to the data center 11.

At step S62, a response signal indicating that the requested data is stored in the secondary cache area on the RAN is transmitted to the file acquisition unit 4-1.

At step S57, the file acquisition unit 4-1 generates a path (i.e., information indicative of the data location) to reach the requested data. The path may be expressed as "/DATA/APi/Second/FileA", for example.

At step S58, the information indicative of the data location is reported from the file acquisition unit 4-1 to the user apparatus.

At step S14, the user apparatus accesses the data location. At step S15, the user sends a request to download the requested data to the secondary cache area on the RAN.

At step S35, the requested data (file A) is downloaded to the user apparatus in response to the download request. With this, the procedure comes to an end.

It should be noted that the user apparatus can obtain the requested data by directly accessing the original data stored in the shared disk area of the data center 11 after learning at step S22 that the requested data is not stored in any primary cache area. In this case, such data may still be absent in any cache areas when the data is accessed on the next occasion. The user thus needs to access the original data again in order to acquire the data. In this embodiment, however, the requested data is stored in the secondary cache area on the RAN through the steps S55, S56, S61, S33, and S34, thereby providing for the user apparatus to access the secondary cache area. With this arrangement, the requested data will be obtained by accessing the secondary cache area when access to the data is requested on the next occasion. This improves the cache hit rate.

FIG. 22 is a flowchart showing the procedure performed when a user acquires data in the case of the pattern 5. The pattern 5 corresponds to a case in which the data is not cached but stored only in the individual disk area. This procedure is substantially the same as that of the pattern 4 shown in FIG. 21, except that the requested data situated in the individual disk area is transferred to the secondary cache area on the RAN. In this case also, the requested data is stored in the secondary cache area on the RAN, thereby providing for the user apparatus to access the secondary cache area, so that the cache hit rate is improved.

Further, the present invention is not limited to these embodiments, but various variations and modifications may be made without departing from the scope of the present invention.

What is claimed is:

1. A data center for use in a mobile communication system that includes mobile phones, a radio access network, and a core network, wherein the data center communicates with an external network provided outside the mobile communication system, comprising:
   an individual storage unit having storage areas for the respective mobile phones;
   a shared storage unit having a storage area for sharing by the mobile phones;
   a shared/individual determining unit configured to receive data requested by at least one of the mobile phones from an external node of the external network and to store the received data in one of the individual storage unit and the shared storage unit that is selected according to predetermined criteria;
   a data arrangement information generating unit configured to generate a data arrangement list according to statistics of the received data and predetermined cache data arrangement conditions, the predetermined cache data arrangement conditions being information about cache servers of the radio access network and cache servers of the core network; and
   a unit configured to transmit an instruction signal to at least one of the shared storage unit and the individual storage unit according to the data arrangement list, so that the data received by the data center from the external node of the external network provided outside the mobile communication system are transferred from the at least one of the shared storage unit and the individual storage unit of the data center to a cache server provided on the core network or a cache server provided on the radio access network.

2. The data center as claimed in claim 1, further comprising a unit configured to notify a mobile phone of a location of data requested by the mobile phone, the location being at the cache server provided on the core network or at the cache server provided on the radio access network.

3. The data center as claimed in claim 1, wherein the predetermined criteria stipulate that data requested by more than a predetermined number of users is stored in the shared storage unit.

4. The data center as claimed in claim 1, wherein the cache data arrangement conditions are defined separately for each of the cache servers provided on the core network and the radio access network, and stipulate that data is cached according to data-type-specific priority.

5. The data center as claimed in claim 4, wherein priority of a data type defined for the cache server provided on the core network is different from priority of the data type defined for the cache server provided on the radio access network.

6. The data center as claimed in claim 1, wherein the cache data arrangement conditions are defined separately for each of the cache servers provided on the core network and the radio access network, and stipulate that data is cached at a given cache server according to data-type-specific priority when an amount of data stored in the shared storage unit exceeds a storage capacity of the given cache server.

7. The data center as claimed in claim 6, wherein priority of a data type defined for the cache server provided on the core network is different from priority of the data type defined for the cache server provided on the radio access network.

8. The data center as claimed in claim 7, wherein priority of streaming data defined for the cache server provided on the radio access network is higher than priority of the streaming data defined for the cache server provided on the core network.

9. The data center as claimed in claim 8, wherein priority of audio or video streaming data defined for the cache server provided on the radio access network is higher than priority of the audio or video streaming data defined for the cache server provided on the core network.

10. The data center as claimed in claim 1, wherein the data arrangement list is updated regularly or on an irregular basis.

11. The data center as claimed in claim 1, further comprising a unit configured to refer to the data arrangement list to determine a location of data requested by a mobile phone, the location being at the cache server provided on the core network or at the cache server provided on the radio access network, and to notify the mobile phone of the location.

12. The data center as claimed in claim 11, wherein the cache server provided on the radio access network includes a primary cache area for storing data that is sent thereto according to the data arrangement list independently of a data acquisition request from a mobile phone, and further includes a secondary cache area for storing data that is sent thereto in response to a data acquisition request from a mobile phone, and wherein data requested by a user is transferred from one of the shared storage unit and the individual storage unit to the secondary cache area when the requested data is stored in neither the cache server provided on the core network nor the primary cache area.

13. A cache server for use on a radio access network or a core network in a mobile communication system that includes mobile phones, the radio access network, the core network, and a data center, wherein the data center communicates with an external network provided outside the mobile communication system, and wherein the data center includes: an individual storage unit having storage areas for the respective mobile phones; a shared storage unit having a storage area for sharing by the mobile phones; a shared/individual determining unit configured to obtain data requested by at least one of the mobile phones from an external node of the external network and to store the received data in one of the individual storage unit and the shared storage unit that is selected according to predetermined criteria; and a data arrangement information generating unit configured to generate a data arrangement list according to statistics of the received data and predetermined cache data arrangement conditions, the predetermined cache data arrangement conditions being information about cache servers of the radio access network and cache servers of the core network, said cache server comprising:
   a cache storage unit configured to receive data stored in at least one of the shared storage unit and the individual storage unit from the data center according to the data arrangement list, so that the data obtained by the data center from the external node of the external network provided outside the mobile communication system are transferred from the at least one of the shared storage unit and the individual storage unit of the data center to the cache storage unit provided on the core network or provided on the radio access network; and
   a unit configured to transmit data stored in the cache storage unit to a mobile phone in response to a request from the mobile phone.

14. The cache server as claimed in claim 13, wherein the cache storage unit is provided on the radio access network, and includes:

a primary cache area for storing data that is sent thereto according to the data arrangement list independently of a data acquisition request from a mobile phone; and a secondary cache area for storing data that is sent thereto in response to a data acquisition request from a mobile phone, wherein data requested by a user is transferred from the data center to the secondary cache area when the requested data is stored in neither a cache server provided on the core network nor the primary cache area.

15. A cache management method for use in a data center of a mobile communication system that includes mobile phones, a radio access network, and a core network, wherein the data center communicates with an external network provided outside the mobile communication system, comprising:

receiving data requested by at least one of the mobile phones from an external node of the external network;

storing the received data received from the external node of the external network in one of an individual storage unit and a shared storage unit that is selected according to predetermined criteria, the individual storage unit having storage areas for the respective mobile phones, and the shared storage unit having a storage area for sharing by the mobile phones;

generating a data arrangement list according to statistics of the received data and predetermined cache data arrangement conditions, the predetermined cache data arrangement conditions being information about cache servers of the radio access network and cache servers of the core network; and transmitting an instruction signal to at least one of the shared storage unit and the individual storage unit according to the data arrangement list, so that the data received by the data center from the external node of the external network provided outside the mobile communication system are transferred from the at least one of the shared storage unit and the individual storage unit of the data center to a cache server provided on the core network or a cache server provided on the radio access network.

* * * * *